(12) United States Patent
Reiner

(10) Patent No.: US 6,314,143 B1
(45) Date of Patent: Nov. 6, 2001

(54) CIRCUIT CONFIGURATION FOR MANIPULATION-PROTECTED RECEPTION OF AN OOK-MODULATED SIGNAL

(75) Inventor: Robert Reiner, Neubiberg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/494,770

(22) Filed: Jan. 31, 2000

Related U.S. Application Data

(63) Continuation of application No. PCT/DE98/02094, filed on Jul. 24, 1998.

(30) Foreign Application Priority Data

Jul. 29, 1997 (DE) .............................. 197 32 643

(51) Int. Cl.[7] .................................................. H04L 27/04
(52) U.S. Cl. ............................................. 375/309; 375/322
(58) Field of Search ....................................... 375/309, 322

(56) References Cited

U.S. PATENT DOCUMENTS

| | | | |
|---|---|---|---|
| 4,641,374 | * | 2/1987 | Oyama ............................ 455/603 |
| 4,818,998 | * | 4/1989 | Apsell et al. ..................... 342/51 |
| 5,502,445 | * | 3/1996 | Dingwall et al. ................. 342/51 |
| 5,715,236 | * | 2/1998 | Gilhousen et al. ............... 370/209 |

FOREIGN PATENT DOCUMENTS

| | | |
|---|---|---|
| 0282926A2 | 9/1988 | (EP) . |
| 0387071A2 | 9/1990 | (EP) . |

* cited by examiner

Primary Examiner—Stephen Chin
Assistant Examiner—Tony Al-Beshrawi
(74) Attorney, Agent, or Firm—Herbert L. Lerner; Laurence A. Greenberg; Werner H. Stemer

(57) ABSTRACT

A circuit configuration for receiving an OOK-modulated signal, in particular for use in a data carrier of an identification system. The configuration has a demodulator circuit, a decoding circuit that is connected downstream of the latter and a sequential control for controlling in particular the reception, demodulation and processing of received data. A switching element that is driven by the sequential control is disposed between the demodulator circuit and the decoding circuit. An input of the switching element is connected to the output of the demodulator circuit and a first output of the switching element being connected to the input of the decoding circuit. The switching element has a second output that is connected to the reset input of the circuit configuration.

7 Claims, 2 Drawing Sheets

CIRCUIT CONFIGURATION FOR MANIPULATION-PROTECTED RECEPTION OF AN OOK-MODULATED SIGNAL

CROSS-REFERENCE TO RELATED APPLICATION

This is a continuation of copending International Application PCT/DE98/02094, filed Jul. 24, 1998, which designated the United States.

BACKGROUND OF THE INVENTION

FIELD OF THE INVENTION

The invention relates to a circuit configuration for receiving an on-off-keying-modulated signal (OOK-modulated signal), in particular for use in a data carrier of an identification system. The configuration has a reception circuit, a demodulator circuit which is connected downstream of the latter, and a decoding circuit which is connected downstream of the latter and a sequential controller for controlling in particular the reception, demodulation and processing of received data.

Such a circuit configuration is known from Published, European Patent Application EP 0 669 591 A2.

In the case of identification systems, data are exchanged between a stationary or quasi-stationary unit and a mobile or portable unit—referred to below as a data carrier—which has at least one memory. Power is also frequently transmitted from the stationary unit to the data carrier, preferably by inductive coupling or electromagnetic radiation. Examples of this are access control devices with a portable identifier, such as a chip card for example. However, electronic immobilizers with a key-lock system are also examples of the identification systems of the generic type.

In identification systems of the generic type, data are transmitted from the stationary unit to the data carrier by OOK-modulation. The high-frequency carrier signal is used directly as a clock signal—possibly after suitable division and/or conditioning for digital signal processing—with the result that the blanking intervals occurring in the carrier signal owing to the modulation also appear in the clock signal. In addition, the power that is necessary to supply the data carrier is acquired by rectification and smoothing of the transmitted signal.

The OOK-modulated carrier signal is demodulated either directly from the transmitted and received signal or from the clock signal that is acquired from the signal. This is possible because the clock signal also has the blanking intervals, and thus the modulation. The circuits in the data carrier of the known identification system are configured here in such a way that a brief gating out of the clock is tolerated.

The reception of data takes place here according to a predefined protocol that is controlled by a sequential controller (state machine). Interruption in the clock at a time other than that permitted according to the rules of the reception protocol causes the reception to be aborted.

Published, European Patent Application EP 0 387 071 A1 also discloses how a reset signal is derived in a transponder from the clock signal which has been derived from an OOK-modulated carrier signal. The reset signal resets circuit components of the transponder if the pause between two time periods in which the carrier signal occurs exceeds a specific time period.

After the reception of the data that may constitute instructions or else values that are to be processed, the data are processed. Such processing contains reading and writing data or values in the nonvolatile memory of the data carrier and also the transmission of data to the stationary unit, and possibly the encryption of data. During the processing of the received data, the data carrier does not expect any further data, and thus any interruption in the clock, because the carrier signal is not modulated by the stationary unit.

However, this leads to a security risk because in principle the system tolerates the clock being stopped. A hacker could then stop the clock, or gate it out, and examine the respective state of the circuit and thus find out about the structure and method of operation in order to enable himself to simulate it.

In order to counter this problem, there is already the tendency in the specialist world to use amplitude modulation with a relatively low modulation index instead of a 100% OOK modulation. Therefore, less robust demodulation has to be implemented on the data carrier, which leads to increased costs due to a lower yield, more complex measurement method or poorer compatibility.

SUMMARY OF THE INVENTION

It is accordingly an object of the invention to provide a circuit configuration for manipulation-protected reception of an OOk-modulated signal that overcomes the above-mentioned disadvantages of the prior art devices of this general.

With the foregoing and other objects in view there is provided, in accordance with the invention, a circuit configuration for receiving an on-off-keying-modulated signal, including:

a demodulator circuit having an output;
   a decoding circuit connected downstream of the demodulator circuit and having an input;
   a sequential controller for controlling a reception, demodulation and processing of received data, the sequential controller having a reset input; and
   a switching element driven by the sequential controller and disposed between the demodulator circuit and the decoding circuit, the switching element having an input connected to the output of the demodulator circuit, a first output connected to the input of the decoding circuit, and a second output connected to the reset input of the sequential controller, the switching element being driven by the sequential controller such that the output of the demodulator circuit being connected via the switching element to the input of the decoding circuit in a first operating state in which the data are received, and to the reset input of the sequential controller in a second operating state in which no data are received.

The switching element is disposed between the demodulator circuit and the decoding circuit of the data-carrier circuit configuration of the identification system. The switching element is used to connect—controlled by the sequential controller—the output of the demodulator circuit to the reset input of the sequential controller in the operating state in which no data are received.

If no data are transmitted from a reading station of the identification system to a data carrier, the carrier signal, which still has to be transmitted in order to transmit power, is not modulated with the result that the demodulator circuit outputs a constant signal, while the clock signal, which is also derived from the carrier signal, does not have any intervals.

If a hacker now interrupts the carrier signal, and thus the clock signal, in order to be able to examine the state of the circuit configuration in this interruption time period, the demodulator circuit would change the state at its output. Which then, according to the invention, brings about a reset of the circuit configuration so that it is not possible to examine instantaneous states of the circuit configuration by interrupting the clock.

The derivation of the clock signal from the high-frequency carrier signal can be effected by, for example, limitation and transformation at the switching level. Depending on the logic selected, the clock signal will then have a low or a high level in a pause in the clock signal. If the demodulator circuit has a first pause recognition circuit, which is advantageously formed with a retriggerable monoflop because this is simpler and thus more cost-effective, it is necessary to know the state of the signal which is to be demodulated while a carrier signal is gated out. The signal that is to be demodulated can be here, as already stated, either the clock signal that is derived from the signal that has already been transmitted by a reading station and received by the data carrier, or a signal which is derived from the received signal in the demodulator circuit and transformed to the switching level.

In order to ensure better protection against attacks by hackers, the quiescent state of the signal which is supplied to the first pause recognition circuit can be advantageously undefined. In this case, according to the invention, the first pause recognition circuit which is contained in the demodulator circuit has connected in parallel with it a further pause recognition circuit with a negating input. The output of the further pause recognition circuit is connected to the reset input of the sequential controller. The connection of both the second output of the switching element and of the output of the second pause recognition circuit to the reset input of the sequential controller can be made, for example, by an OR gate. This advantageous development ensures that each interruption in the clock signal is recognized independently of the signal level that is occurring at that time and is being fed to the demodulator circuit and leads to a reset. In an equivalent way it would also be possible to connect a differentiating circuit upstream of the first pause recognition circuit in the demodulator circuit.

The previous refinement of the circuit configuration according to the invention permits a reset if the circuit configuration is in the data-processing operating state, that is to say is not expecting any reception data. During the reception of data, the interruptions in the clock signal are tolerated because each logic "0" which is transmitted leads to an interruption. This fact could also be misused by a hacker.

In order to solve this problem, in one advantageous development of the invention a third pause recognition circuit is connected in parallel with the first pause recognition circuit. The output of the third pause recognition circuit is also connected to the reset input of the sequential controller, for example also by the OR gate. However, the third pause recognition circuit has a significantly longer delay time than the first pause recognition circuit so that a circuit reset does take place, but only when there are relatively long pauses in the clock signal.

Other features which are considered as characteristic for the invention are set forth in the appended claims.

Although the invention is illustrated and described herein as embodied in a circuit configuration for manipulation-protected reception of an OOK-modulated signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
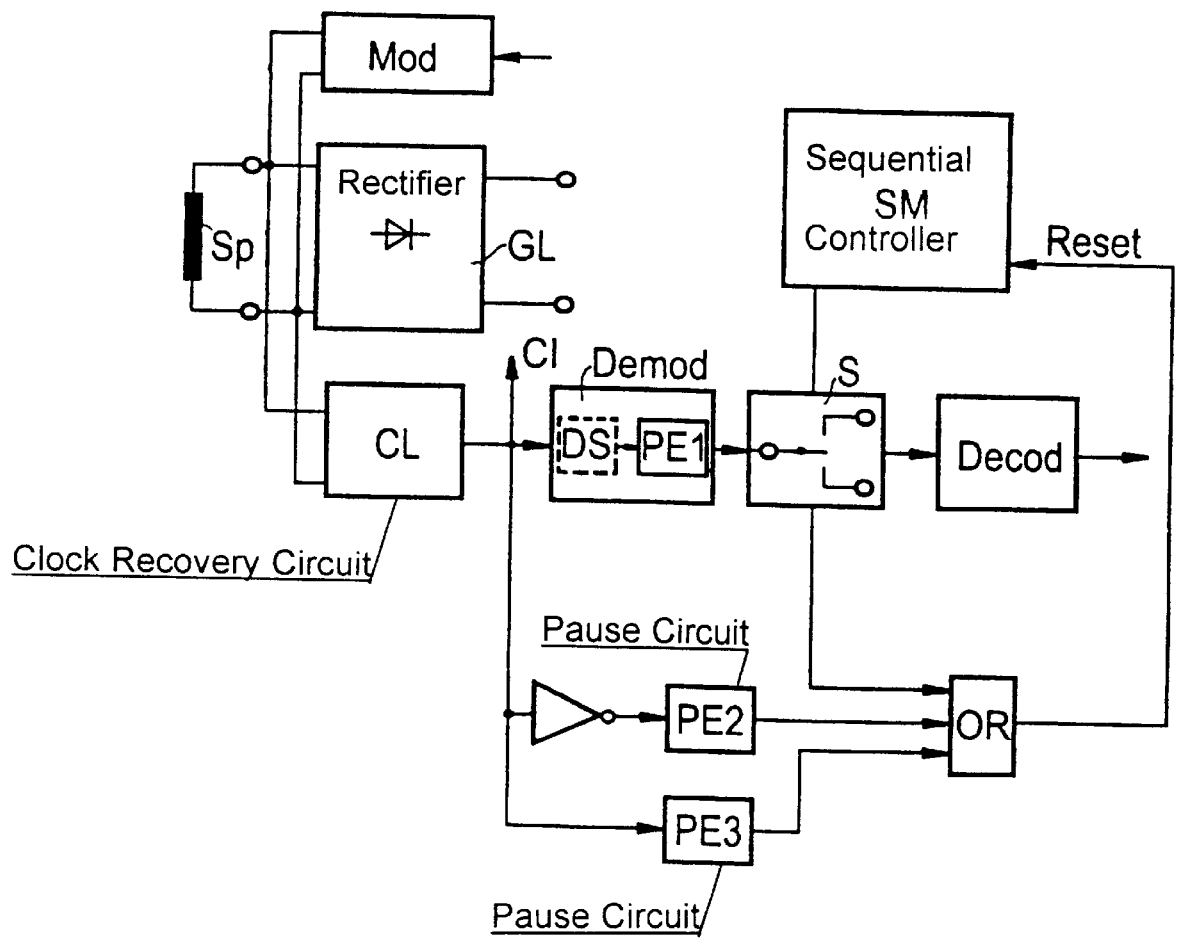
FIG. 1 is a basic block diagram of a circuit configuration according to the invention.

In all the figures of the drawing, sub-features and integral parts that correspond to one another bear the same reference symbol in each case. Referring now to the figures of the drawing in detail and first, particularly, to FIG. 1 thereof, there is shown a reception antenna, embodied as a coil Sp, of a data carrier for an identification system of the generic type. Terminals of the coil Sp are connected to a rectifier circuit GL at whose outputs a supply voltage that is necessary for the data carrier is made available. In order to transmit data from the data carrier to a stationary unit, a modulator Mod is provided whose actuation is indicated merely by an arrow because the modulator Mod is insignificant for the invention. The terminals of the reception antenna Sp are also connected to a clock recovery circuit CL that outputs a clock signal Cl at its output.

An on-off-keying (OOK) modulation is used for transmitting data from the stationary unit to the data carrier so that blanking intervals occur in the carrier signal. The clock signal Cl also has these blanking intervals so that the clock signal Cl can be used for demodulation in a demodulator Demod. However, it would also be possible to feed the output signal of the antenna coil Sp directly to the demodulator Demod. In this case, a suitable signal conditioning circuit—depending on the demodulator type used—would also be necessary.

The output signal of the demodulator circuit Demod is fed to a decoding circuit Decod via a switching element S. The output signal of the decoding circuit Decod is processed further in the data carrier, which is indicated by an arrow. The further processing is without significance in terms of understanding the circuit configuration according to the invention, and is therefore not explained further.

The switching element S is driven by a sequential controller SM and has a second output that is connected to a reset input of the sequential controller SM. Depending on an actuation by the sequential controller SM, the switching element S connects the output of the demodulator circuit Demod either to the decoding circuit Decod or—in the example illustrated—to the reset input of the sequential controller SM via an OR gate OR.

Here, the decoding circuit Decod is connected to the demodulator circuit Demod in a first operational situation in which data are received by the stationary unit. The entire circuit configuration is configured in such a way that blanking intervals in the clock signal Cl are tolerated as long as they occur within the scope of the reception protocol.

In a second operational situation in which the received data are processed in the circuit configuration, the circuit configuration or the data carrier does not expect any data from the stationary unit so that the carrier signal is not modulated and thus no blanking intervals should occur either. However, if they do occur, there is a high probability that misuse is occurring. In order to prevent this misuse, according to the invention the output of the demodulator circuit Demod is connected to the reset input of the sequential controller SM by the sequential controller SM in the second operational situation so that the occurrence of a blanking interval in the clock signal Cl leads to a reset of the entire circuit configuration.

Figure 2:
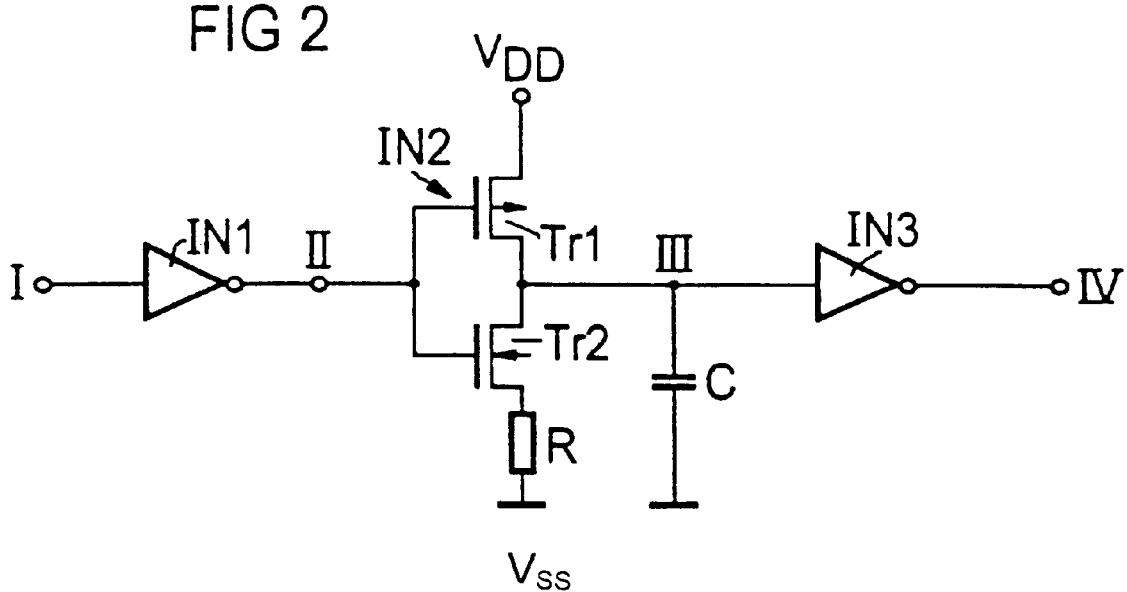
FIG. 2 is a circuit diagram of a retriggerable monoflop.

The demodulator circuit Demod has a first pause recognition circuit PE1 which can be formed, for example, with a retriggerable monoflop illustrated in FIG. 2. Such a pause recognition circuit can detect only a clock pause with a specific polarity. If a blanking interval of the clock signal Cl does not have any defined polarity, which may occur when there is an attack by hackers, in a development according to the invention a second pause recognition circuit PE2 is provided with an input which is negating with respect to the first pause recognition circuit PE1 and whose output is also fed to the reset input of the sequential controller SM via the OR gate OR.

Because the circuit configuration according to FIG. 1 tolerates blanking intervals in the clock signal Cl during reception operation, a hacker could attempt in this operational situation to examine the circuit by prolonging the blanking intervals. In order to prevent such misuse, in a development according to the invention a third pause recognition circuit PE3 is provided, which is also supplied with the clock signal Cl and which acts on the reset input of the sequential control SM via the OR gate OR. The third pause recognition circuit PE3 has, however, a time delay that is greater than that of the two other pause recognition circuits PE1, PE2 because, on the one hand, they respond without fail but on the other hand they are not intended to bring about a circuit reset when there are blanking intervals which are caused by normal modulation. Typical delay times for the pause recognition circuits are, with a carrier frequency of 13.56 MHz which corresponds to the industrial frequency, approximately 300 ns for the first and second pause recognition circuits PE1, PE2 and approximately 6 $\mu$s for the third pause recognition circuit.

Instead of using the second pause recognition circuit PE2 with an inverted input, the first pause recognition circuit PE1 can also have a differentiating circuit DS connected upstream of it, which is indicated by broken lines in FIG. 1. It is also possible in this way to detect both polarities of a blanking interval in the clock signal Cl.

FIG. 2 shows an exemplary embodiment of the pause recognition circuit in the form of a retriggerable monoflop. The monoflop illustrated is composed of three inverters IN1 to IN3 which are connected in series, a resistor R being connected between a source terminal of an n-type channel transistor Tr2 of the second inverter IN2 and a ground terminal Vss. In addition, a capacitor C is connected in parallel with the load path of the n-type channel transistor Tr2 of the second inverter IN2 and with the resistor R.

Figure 3:
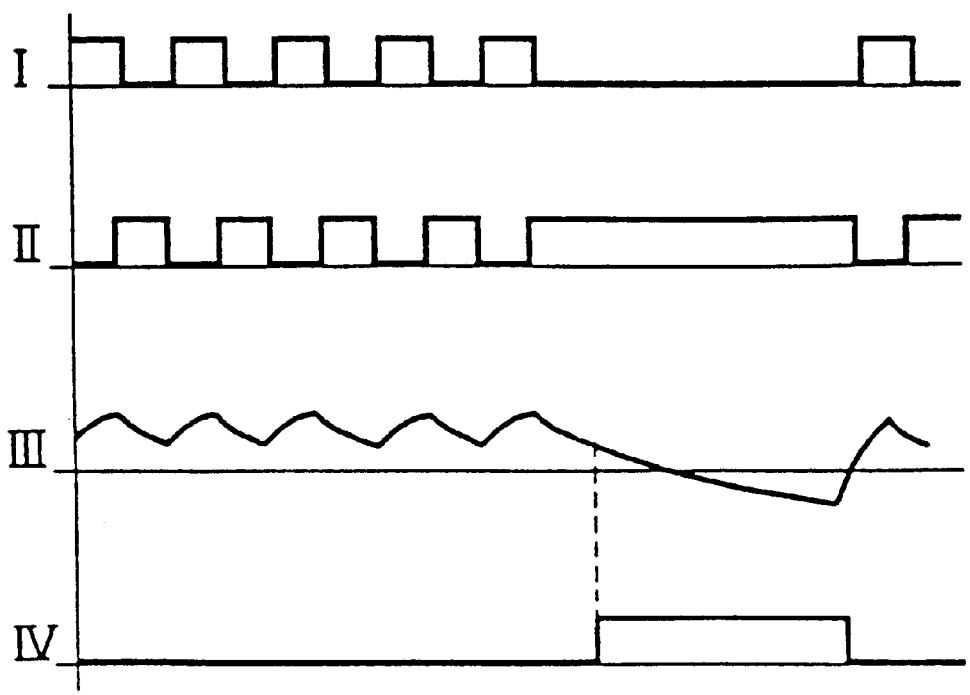
FIG. 3 is a signal diagram of various signals.

The function of the circuit according to FIG. 2 will be explained with reference to the signal diagram according to FIG. 3. The points on the circuit at which the signals are considered are designated with Roman numerals I to IV. The clock signal Cl, for example, will be applied to the input of the circuit I. The signal Cl has a blanking interval or pause when one logic low state, or even a plurality of logic low states, are transmitted. The signal is inverted by the first inverter IN1 and fed to the input of the second inverter IN2.

The inverted signal is represented under II. If the signal at the input of the second inverter IN2 has a logic low state, a p-type channel transistor Tr1 of the second inverter IN2 is switched through so that the capacitor C becomes charged. If the signal at the input of the second inverter IN2 changes its state to a logic high level, the p-type channel transistor Tr1 switches off and the n-type channel transistor Tr2 switches on so that the capacitor C discharges via the load path of this n-type channel transistor Tr2 and the resistor R. The capacitor C and the resistor R must be dimensioned here in such a way that the current does not drop below the switching threshold of the third inverter IN3 during a half period of the clock signal. Only when there is a pause in the input signal of the monoflop can the capacitor C discharge to the extent that the current drops below the switching threshold of the third inverter IN3, and the output of the third inverter IN3 changes its state.

Depending on the type of clock conditioning circuit CL used, the clock signal Cl could also have the profile illustrated under II, that is to say could have a high level when there is a pause. In order to be able to detect a pause in the case of such a signal profile with a circuit according to FIG. 2, all that is necessary is either to connect a further inverter upstream or to omit the first inverter.

The circuit configuration according to the invention and the advantageous developments can be used to provide reliable protection against misuse of identification systems that use 100% OOK modulation.

I claim:

1. A circuit configuration for receiving an on-off-keying-modulated signal, comprising:

a demodulator circuit having an output;

a decoding circuit connected downstream of said demodulator circuit and having an input;

a sequential controller for controlling a reception, demodulation and processing of received data, said sequential controller having a reset input; and a switching element driven by said sequential controller and connected between said demodulator circuit and said decoding circuit, said switching element having an input connected to said output of said demodulator circuit, a first output connected to said input of said decoding circuit, and a second output connected to said reset input of said sequential controller, said switching element being driven by said sequential controller such that said output of said demodulator circuit being connected via said switching element to said input of said decoding circuit in a first operating state in which the data are received, and to said reset input of said sequential controller in a second operating state in which no data are received.

2. The circuit configuration according to claim 1, wherein said demodulator circuit has a pause recognition circuit.

3. The circuit configuration according to claim 2, including:

a further pause recognition circuit connected in parallel with said pause recognition circuit of said demodulator circuit and having an output; and an OR gate logically linking said output of said further pause recognition circuit and said second output of said switching element, said OR gate having an output connected to said reset input of said sequential controller.

4. The circuit configuration according to claim 2, wherein said demodulator circuit has a differentiating circuit connected upstream of said pause recognition circuit.

5. The circuit configuration according to claim 3, including another pause recognition circuit having a longer delay time than that of said pause recognition circuit of said demodulator circuit and connected in parallel with said pause recognition circuit of said demodulator circuit, said another pause recognition circuit having an output connected to said reset input of said sequential controller.

6. The circuit configuration according to claim 5, wherein said pause recognition circuit, said further pause recognition circuit, and said another pause recognition circuit are formed with a retriggerable monoflop.

7. In combination with an identification system having a data carrier, a circuit configuration for receiving an on-off-keying-modulated signal, comprising:

a demodulator circuit having an output;

a decoding circuit connected downstream of said demodulator circuit and having an input;

a sequential controller for controlling a reception, demodulation and processing of received data, said sequential controller having a reset input; and a switching element driven by said sequential controller and connected between said demodulator circuit and said decoding circuit, said switching element having an input connected to said output of said demodulator circuit, a first output connected to said input of said decoding circuit, and a second output connected to said reset input of said sequential controller, said switching element being driven by said sequential controller such that said output of said demodulator circuit being connected via said switching element to said input of said decoding circuit in a first operating state in which the data are received, and to said reset input of said sequential controller in a second operating state in which no data are received.

* * * * *